US010009126B2

(12) United States Patent
Olgaard et al.

(10) Patent No.: US 10,009,126 B2
(45) Date of Patent: Jun. 26, 2018

(54) METHOD FOR TESTING A RADIO FREQUENCY (RF) DATA PACKET SIGNAL TRANSCEIVER WITH MULTIPLE TRANSMITTERS AND RECEIVERS CAPABLE OF CONCURRENT OPERATIONS (71) Applicant: LITEPOINT CORPORATION, Sunnyvale, CA (US)

(72) Inventors: Christian Volf Olgaard, Saratoga, CA (US); Ruizu Wang, San Ramon, CA (US); Zhiyong Huang, P.R. (CN)

(73) Assignee: LitePoint Corporation, Sunnyvale, CA (US)

(*) Notice: Subject to any disclaimer, the term of this patent is extended or adjusted under 35 U.S.C. 154(b) by 165 days.

(21) Appl. No.: 14/966,761

(22) Filed: Dec. 11, 2015

(65) Prior Publication Data
US 2017/0170916 A1 Jun. 15, 2017

(51) Int. Cl.
*H04B 17/29* (2015.01)
*H04L 12/26* (2006.01)
*H04B 17/00* (2015.01)

(52) U.S. Cl.
CPC ......... *H04B 17/29* (2015.01); *H04B 17/0085* (2013.01); *H04L 43/50* (2013.01)

(58) Field of Classification Search
CPC ..... H04B 17/20–17/29; H04B 17/0085; H04L 43/50
See application file for complete search history.

(56) References Cited

U.S. PATENT DOCUMENTS

| 2007/0275667 | A1 | 11/2007 | Leung et al. | |
| 2008/0165836 | A1* | 7/2008 | Landau | H04L 1/0026 375/221 |
| 2012/0269288 | A1* | 10/2012 | Olgaard | H04L 1/24 375/296 |
| 2014/0059397 | A1 | 2/2014 | Barker, Jr. et al. | |
| 2014/0181601 | A1 | 6/2014 | Olgaard et al. | |
| 2015/0189524 | A1 | 7/2015 | Hirst et al. | |

FOREIGN PATENT DOCUMENTS

KR 2010-0002522 A 1/2010

OTHER PUBLICATIONS

Jan. 25, 2017—(WO) International Search Report—App PCT/US2016/058186.

* cited by examiner

*Primary Examiner* — Hoon J Chung
(74) *Attorney, Agent, or Firm* — McCracken & Gillen LLC (57) ABSTRACT

Method for testing a radio frequency (RF) data packet signal transceiver device under test (DUT) with multiple RF signal transmitters and RF signal receivers capable of concurrent operations. Multiple successions of test data packets from a tester to respective RF signal receivers of the DUT and multiple successions of responsive DUT data packets from respective RF signal transmitters of the DUT to the tester are conveyed such that multiple RF signal transmissions, multiple RF signal receptions, or RF signal transmission and reception are performed at least partially concurrently.

9 Claims, 6 Drawing Sheets

METHOD FOR TESTING A RADIO FREQUENCY (RF) DATA PACKET SIGNAL TRANSCEIVER WITH MULTIPLE TRANSMITTERS AND RECEIVERS CAPABLE OF CONCURRENT OPERATIONS

BACKGROUND

The present invention relates to testing of a radio frequency (RF) data packet signal transceiver, and in particular, to testing such a device having multiple transmitters and receivers capable of simultaneous operations.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include one or more vector signal generators (VSG) for providing the source, or test, signals to be transmitted to the DUT, and one or more vector signal analyzers (VSA) for analyzing signals produced by the DUT. The production of test signals by a VSG and signal analysis performed by a VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Testing of wireless devices typically involves testing of a their receiving and transmitting subsystems. The tester will typically send a prescribed sequence of test data packet signals to a DUT, e.g., using different frequencies, power levels, and/or modulation technologies, to determine if the DUT receiving subsystem is operating properly. Similarly, the DUT will send test data packet signals at a variety of frequencies, power levels, and/or modulation technologies to determine if the DUT transmitting subsystem is operating properly.

Such wireless devices are increasingly supporting simultaneous operations of multiple transmitters, multiple receivers and/or both a transmitter and a receiver in the same or different signal bands, often using a single integrated circuit (IC) component within the device for performing those concurrent operations. From a testing perspective, these simultaneous operations pose new potential device performance problems that must be tested during manufacture to identify possible defects. For example, when two transmitters are operating simultaneously, power demand on the system power supply increases and can cause "pushing" or "pulling" of the operating frequencies of voltage controlled oscillators (VCOs) providing the carrier signal(s) and/or frequency up-conversion or down-conversion signal(s). Such increased power demand can also limit or reduce the power of the transmitted signal(s).

Also, in the case where one transceiver is receiving while a second transceiver in the same IC is transmitting, the transmitted signal can cause blocking in the receiver, particularly if using radiated (wireless) rather than conducted (wired) signal conveyance. The transmitted signal can also affect power supply voltage levels enough to pull the frequency of the VCO cause signal gain changes within the receiver.

Accordingly, it would be desirable to have techniques enabling reliable testing of wireless devices with multiple RF signal transmitters and receivers designed for simultaneous operations of their multiple transmitters, multiple receivers and/or both a transmitter and a receiver.

SUMMARY

In accordance with the presently claimed invention, a method is provided for testing a radio frequency (RF) data packet signal transceiver device under test (DUT) with multiple RF signal transmitters and RF signal receivers capable of concurrent operations. Multiple successions of test data packets from a tester to respective RF signal receivers of the DUT and multiple successions of responsive DUT data packets from respective RF signal transmitters of the DUT to the tester are conveyed such that multiple RF signal transmissions, multiple RF signal receptions, or RF signal transmission and reception are performed at least partially concurrently.

In accordance with one embodiment of the presently claimed invention, a method for testing a radio frequency (RF) data packet signal transceiver device under test (DUT) with at least first and second RF signal transmitters and first and second RF signal receivers capable of concurrent operations, comprising:

transmitting a first RF test data packet signal including a succession of a first plurality of test data packets;

receiving, from the first RF signal transmitter, a first RF DUT data packet signal responsive to one or more portions of the first RF test data packet signal and including a succession of a first plurality of DUT data packets related to one or more portions of the succession of a first plurality of test data packets;

transmitting a second RF test data packet signal including a succession of a second plurality of test data packets; and receiving, from the second RF signal transmitter, a second RF DUT data packet signal responsive to one or more portions of the second RF test data packet signal and including a succession of a second plurality of DUT data packets related to one or more portions of the succession of a second plurality of test data packets;

wherein each one of at least a portion of the first plurality of DUT data packets is received at least partially concurrently with transmission of a respective one of at least a portion of the second plurality of test data packets, and each one of at least a portion of the second plurality of DUT data packets is received at least partially concurrently with transmission of a respective one of at least a portion of the first plurality of test data packets.

In accordance with another embodiment of the presently claimed invention, a method for testing a radio frequency (RF) data packet signal transceiver device under test (DUT) with at least first and second RF signal transmitters and first and second RF signal receivers capable of concurrent operations, comprising:
 transmitting a first RF test data packet signal including a succession of a first plurality of test data packets;
 receiving, from the first RF signal transmitter, a first RF DUT data packet signal responsive to one or more portions of the first RF test data packet signal and including a succession of a first plurality of DUT data packets related to one or more portions of the succession of a first plurality of test data packets;
 transmitting a second RF test data packet signal including a succession of a second plurality of test data packets; and
 receiving, from the second RF signal transmitter, a second RF DUT data packet signal responsive to one or more portions of the second RF test data packet signal and including a succession of a second plurality of DUT data packets related to one or more portions of the succession of a second plurality of test data packets;
 wherein each one of at least a portion of the first plurality of DUT data packets is received at least partially concurrently with transmission of a respective one of at least a portion of the second plurality of test data packets, and the first and second pluralities of DUT data packets are received during mutually exclusive time intervals.

In accordance with another embodiment of the presently claimed invention, a method for testing a radio frequency (RF) data packet signal transceiver device under test (DUT) with at least first and second RF signal transmitters and first and second RF signal receivers capable of concurrent operations, comprising:
 transmitting a first RF test data packet signal including a succession of a first plurality of test data packets;
 receiving, from the first RF signal transmitter, a first RF DUT data packet signal responsive to one or more portions of the first RF test data packet signal and including a succession of a first plurality of DUT data packets related to one or more portions of the succession of a first plurality of test data packets;
 transmitting a second RF test data packet signal including a succession of a second plurality of test data packets; and
 receiving, from the second RF signal transmitter, a second RF DUT data packet signal responsive to one or more portions of the second RF test data packet signal and including a succession of a second plurality of DUT data packets related to one or more portions of the succession of a second plurality of test data packets;
 wherein
  each one of at least a portion of the first plurality of test data packets is transmitted at least partially concurrently with transmission of a respective one of at least a portion of the second plurality of test data packets, and
  each one of at least a portion of the first plurality of DUT data packets is received at least partially concurrently with reception of a respective one of at least a portion of the second plurality of DUT data packets.

In accordance with another embodiment of the presently claimed invention, a method for testing a radio frequency (RF) data packet signal transceiver device under test (DUT) with at least first and second RF signal transmitters and first and second RF signal receivers capable of concurrent operations, comprising:
 receiving, with the first RF signal receiver, a first RF test data packet signal including a succession of a first plurality of test data packets;
 transmitting, with the first RF signal transmitter, a first RF DUT data packet signal responsive to one or more portions of the first RF test data packet signal and including a succession of a first plurality of DUT data packets related to one or more portions of the succession of a first plurality of test data packets;
 receiving, with the second RF signal receiver, a second RF test data packet signal including a succession of a second plurality of test data packets; and
 transmitting, with the second RF signal transmitter, a second RF DUT data packet signal responsive to one or more portions of the second RF test data packet signal and including a succession of a second plurality of DUT data packets related to one or more portions of the succession of a second plurality of test data packets;
 wherein
  each one of at least a portion of the first plurality of DUT data packets is received at least partially concurrently with transmission of a respective one of at least a portion of the second plurality of test data packets, and
  each one of at least a portion of the second plurality of DUT data packets is received at least partially concurrently with transmission of a respective one of at least a portion of the first plurality of test data packets.

In accordance with another embodiment of the presently claimed invention, a method for testing a radio frequency (RF) data packet signal transceiver device under test (DUT) with at least first and second RF signal transmitters and first and second RF signal receivers capable of concurrent operations, comprising:
 receiving, with the first RF signal receiver, a first RF test data packet signal including a succession of a first plurality of test data packets;
 transmitting, with the first RF signal transmitter, a first RF DUT data packet signal responsive to one or more portions of the first RF test data packet signal and including a succession of a first plurality of DUT data packets related to one or more portions of the succession of a first plurality of test data packets;
 receiving, with the second RF signal receiver, a second RF test data packet signal including a succession of a second plurality of test data packets; and
 transmitting, with the second RF signal transmitter, a second RF DUT data packet signal responsive to one or more portions of the second RF test data packet signal and including a succession of a second plurality of DUT data packets related to one or more portions of the succession of a second plurality of test data packets;
 wherein each one of at least a portion of the first plurality of DUT data packets is received at least partially concurrently with transmission of a respective one of at least a portion of the second plurality of test data packets, and the first and second pluralities of DUT data packets are received during mutually exclusive time intervals.

In accordance with another embodiment of the presently claimed invention, a method for testing a radio frequency (RF) data packet signal transceiver device under test (DUT) with at least first and second RF signal transmitters and first and second RF signal receivers capable of concurrent operations, comprising:

receiving, with the first RF signal receiver, a first RF test data packet signal including a succession of a first plurality of test data packets;

transmitting, with the first RF signal transmitter, a first RF DUT data packet signal responsive to one or more portions of the first RF test data packet signal and including a succession of a first plurality of DUT data packets related to one or more portions of the succession of a first plurality of test data packets;

receiving, with the second RF signal receiver, a second RF test data packet signal including a succession of a second plurality of test data packets; and transmitting, with the second RF signal transmitter, a second RF DUT data packet signal responsive to one or more portions of the second RF test data packet signal and including a succession of a second plurality of DUT data packets related to one or more portions of the succession of a second plurality of test data packets;

wherein each one of at least a portion of the first plurality of test data packets is transmitted at least partially concurrently with transmission of a respective one of at least a portion of the second plurality of test data packets, and each one of at least a portion of the first plurality of DUT data packets is received at least partially concurrently with reception of a respective one of at least a portion of the second plurality of DUT data packets.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

As discussed in more detail below, in accordance with exemplary embodiments of the presently claimed invention, methods are provided for testing non-synchronized simultaneous multi-band operation of wireless radio frequency (RF) signal transceivers. In accordance with the presently claimed invention, such test methods are effectively controlled by the tester by using the transmitted response of the DUT to a correctly received data packet (e.g., an acknowledgement data packet or "ACK" signal) as an interfering DUT signal transmission in one frequency band that occurs concurrently with DUT operation in a second frequency band. Accordingly, the tester can control timing from the DUT, since DUT response time is typically defined by specific timing requirements.

The tester will preferably include multiple test data packet signal sources (e.g., multiple VSGs) that can be operated in a coordinated manner to provide simultaneous test data packet signals for reception by multiple DUT receivers. The timing of the test data packet signals, as well as the characteristics of test data packet signals, will provide the requisite control over the timing and juxtaposition of the ACK signals from the DUT to ensure that interference by the ACK signals occur concurrently with test data packet signals being received by another DUT receiver at a variety of time intervals relative to the test data packet signal durations, thereby enabling identification of problems related to such interfering signals. Accurate control over such potential interference between test data packet signals and ACK signals enables repeated test measurements for multiple devices and can ensure reliable testing while also ensuring worst case scenarios.

Figure 1:
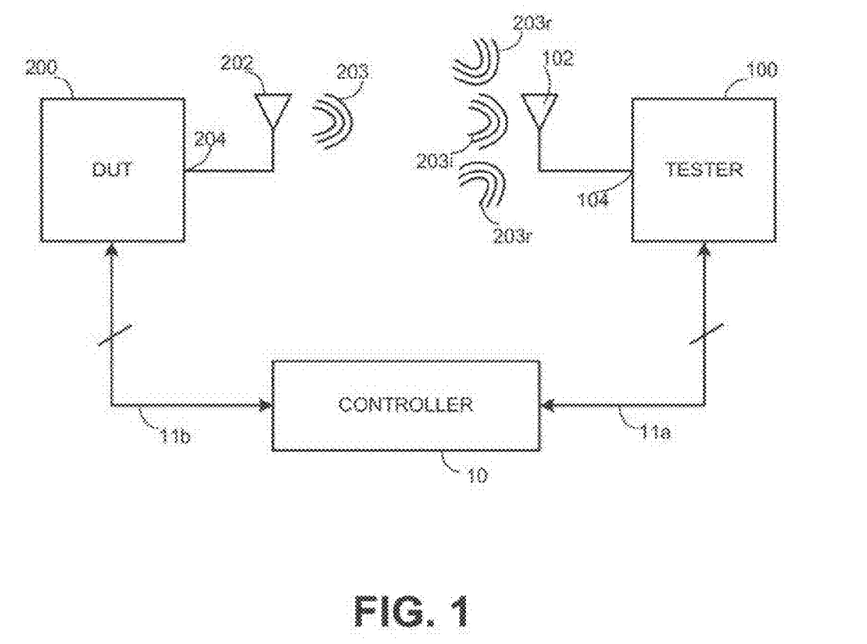
FIG. 1 depicts a typical operating and possible testing environment for a wireless signal transceiver.

Referring to FIG. 1, a typical operating environment, and ideal testing environment for a wireless signal transceiver (at least in terms of simulating real world operation), would have the tester 100 and DUT 200 communicate wirelessly. Typically, some form of test controller 10, (e.g., a personal computer) will also be used to exchange testing commands and data via wired signal interfaces 11a, 11b with the tester 100 and DUT 200. The tester 100 and DUT 200 each have one (or more for MIMO devices) respective antennas 102, 202, which connect by way of conductive signal connectors 104, 204 (e.g., coaxial cable connections, many types of which are well known in the art). Test signals (source and response) are conveyed wirelessly between the tester 100 and DUT 200 via the antennas 102, 202. For example, during a transmit (TX) test of the DUT 200, electromagnetic signals 203 are radiated from the DUT antenna 202. Depending upon the directivity of the antenna emission pattern, this signal 203 will radiate in numerous directions, resulting in an incident signal component 203i and reflected signal components 203r being received by the tester antenna 102. As discussed above, these reflected signal components 203r, often the products of multipath signal effects as well as other electromagnetic signals originating elsewhere (not shown), result in constructive and destructive signal interference, thereby preventing reliable and repeatable signal reception and testing results.

Figure 2:
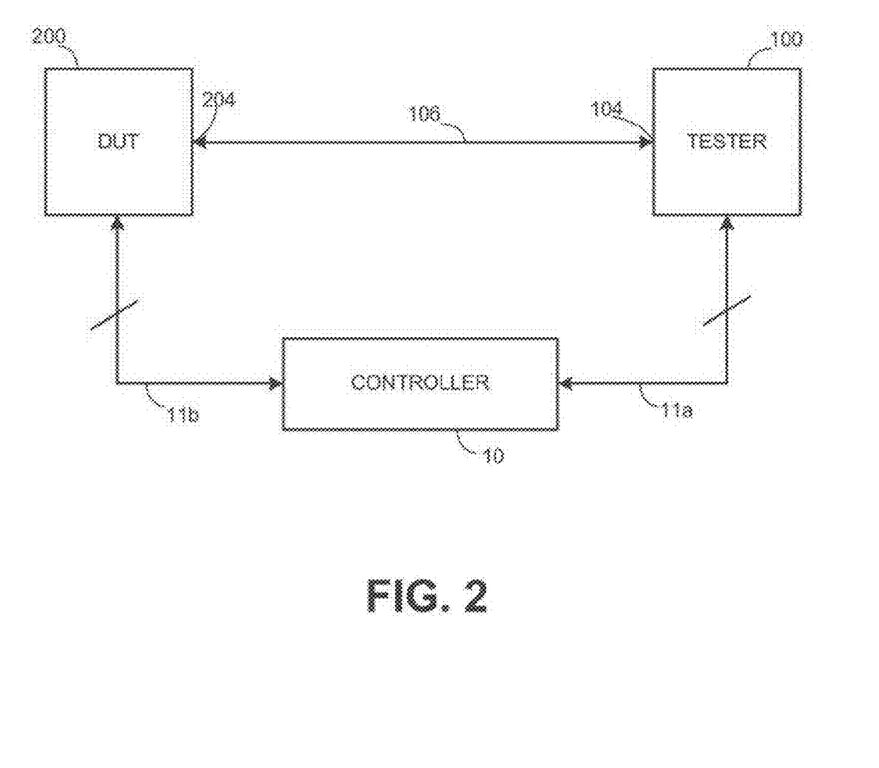
FIG. 2 depicts a testing environment for a wireless signal transceiver using a conductive test signal path.

Referring to FIG. 2, to avoid such unreliable testing results, a conductive signal path, such as a RF coaxial cable 106, is used to connect the antenna connectors 104, 204 of the tester 100 and DUT 200 to provide a consistent, reliable and repeatable electrically conductive signal path for conveyance of the test signals between the tester 100 and DUT 200. As discussed above, however, this increases the overall test time due to the time needed for connecting and disconnecting the cable 106 before and after testing.

Figure 3:
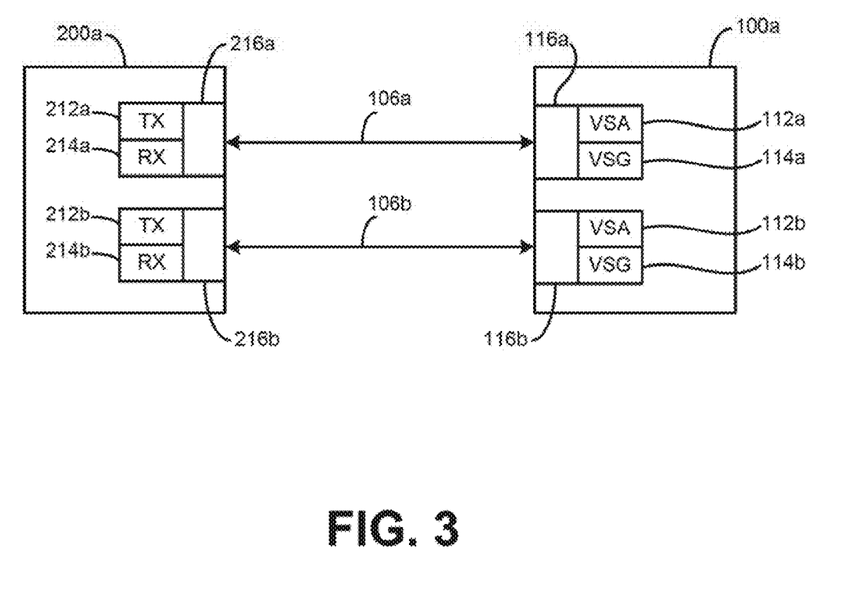
FIG. 3 depicts a testing environment for testing a radio frequency (RF) data packet signal transceiver device under test (DUT) with multiple RF signal transmitters and RF signal receivers capable of concurrent operations in accordance with exemplary embodiments of the presently claimed invention.

Referring to FIG. 3, as noted above, test methods in accordance with the presently claimed invention can be advantageously practiced using a tester 100a having multiple test data packet signal sources and receivers, as well as a DUT 200a also having multiple data packet signal transmitters and receivers. For example, the tester 100a would include multiple test data packet signal sources (e.g., VSGs) 114a, 114b and multiple data packet receivers (e.g., VSAs) 112a, 112b connected to the signal paths 106a, 106b via signal coupling devices 116a, 116b, such as RF signal switches, couplers or diplexers. Similarly, each DUT 200a would include multiple signal transmitters 212a, 212b and multiple signal receivers 214a, 214b, also connected to the test signal paths 106a, 106b via RF signal coupling circuits 216a, 216b.

Figure 4:
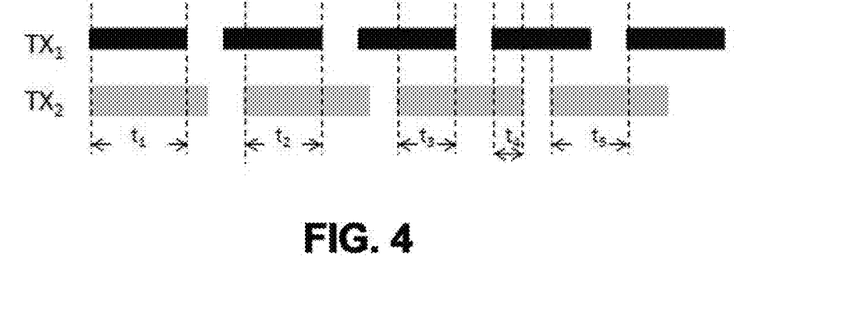
FIG. 4 depicts a test interval during which two DUT transceivers are transmitting concurrently.

Referring to FIG. 4, when two DUT transceivers are controlled so as to transmit data packet signals concurrently, portions of times when both signal transmissions TX1, TX2 are, at least partially, concurrent can be varied by altering the duty cycle of each signal transmission TX1, TX2 relative to the other. Accordingly, the signal transmissions TX1, TX2 can have concurrent signal intervals, at least in part, during time intervals t1, t2, t3, t4, t5, as shown. If these signal transmissions TX1, TX2 continue for a sufficient time duration, the two originating signal transmitters would be transmitting data packet signals having at least partially concurrent transmit intervals that shift in position over time.

For example, during the first time interval t1, the first signal transmission TX1 would be concurrent during its entire signal time with part of the second signal transmission TX2. Following a subsequent time interval t4, the second signal transmission TX2 will have had concurrent signal intervals with the first transmitted signal TX1 spanning a complete signal cycle of the second signal transmission TX2. During these concurrent signal transmissions, the signal analysis subsystems of the tester can be evaluating characteristics of these signal transmissions TX1, TX2, such as the error vector magnitude (EVM) of each signal, to determine whether concurrent transmit operations have resulted in transmitted signal characteristics having levels, values or qualities degraded enough so as to not meet prescribed standard specifications or limits. This ability to reliably test with concurrent signal transmissions TX1, TX2 is particularly advantageous when ramping (e.g., up or down) the signal power levels.

While such a test methodology can provide valuable test results, further advantages can be achieved when relative positions of the two signal transmissions TX1, TX2 can be identified to ensure proper detection of any interaction between these signals. Further, as the two DUT transmitters operate in a non-synchronized manner, it would be desirable to ensure that the same overlap condition for the data packet signal intervals can be maintained from one DUT to another.

Analyzing EVM on a per-symbol basis can provide at least partial compensation inasmuch as affected symbols can be used for analysis while omitting unaffected symbols. However, since not all captured packets will produce the desired number of symbols being affected, more packets are needed to enable sufficient averaging for an EVM calculation. Further testing efficiency can be achieved by setting up a worst case scenario for signal interaction, e.g., ramping down signal power soon after a channel estimate has been established, thereby producing a greater number of affected symbols. Otherwise, it may be difficult to reliably acquire the required number of affected symbols without capturing many consecutive packets and performing post-capture analyses to determine the source of interference.

Figure 5:
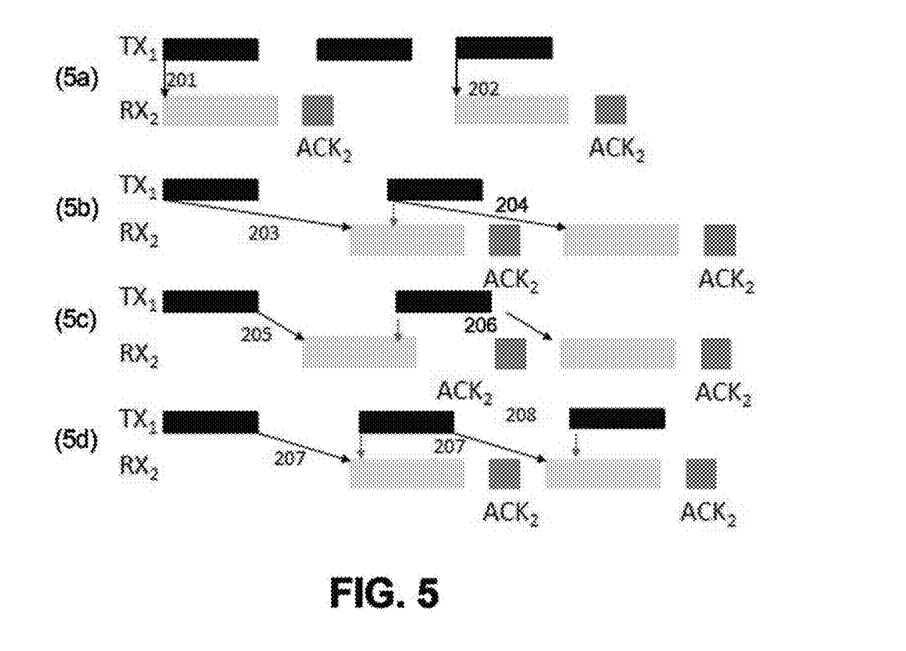
FIG. 5 depicts test intervals during which a DUT transmitter and DUT receiver are transmitting and receiving at least partially concurrently.

Referring to FIG. 5, in instances where multiple DUT transceivers operate such that one is receiving concurrently with another transmitter transmitting, it is possible that errant receiver operation will occur do to interference of the concurrent transmitted signal. This can be tested by evaluating packet error rate (PER) during concurrent transmitter and receiver operations. As depicted in signal sequence 5a, this can be achieved by time aligning the data packet transmissions to allow the VSG to trigger at the beginning or the end of a transmitted data packet. As shown, the beginning of a transmitted DUT data packet triggers 201 the VSG to cause it to transmit a receive data packet RX2 for the second DUT receiver to receive. A second tester data packet transmission TX1 occurs during a subsequent time interval during which the DUT transmits its acknowledgment ACK2. This is followed by another triggering event 202 occurring with an intervening DUT data packet transmission TX1 not generating a corresponding receive operation RX2 (due to the DUT channel otherwise occupied with transmission of its acknowledgment ACK2).

Normally, a small delay between triggering of the start of a data packet will exist do to internal delays, as well as to ensure a smooth ramping of signal power of the transmitted data packet. The beginning of the data packet transmit operation is when most power supply current is likely to be consumed, and happens prior to or at the beginning of a received data packet. The received data packet header often includes data redundancy to ensure that the receiver can receive the data packet without necessarily needing to detect the precise beginning of the packet.

As shown in signal sequence 5b, it is possible to ensure that testing captures any negative effects from such increased power supply current consumption by delaying the received VSG data packet transmissions RX2 in accordance with delayed triggers 203, 204 to ensure that the DUT data packet transmissions TX1 interact with the next received VSG data packet transmission RX2.

As shown in signal sequence 5c, this can also be accomplished by triggering at the end of the DUT data packet transmissions TX1 using delayed triggers 205, 206, as shown.

As shown in signal sequence 5d, the tester can also control the delay by moving the start of the DUT data packet transmissions TX1 to different positions relative to the receptions of tester data packets RX2. This is based upon an assumption that the duty cycle of DUT data packet transmission is constant, so a prior DUT data packet transmission TX1 is used to control interaction with the expected subsequent reception of a tester data packet RX2. However, if the duty cycle is not constant, as represented by a longer delay 208 between data packets, the time intervals during which the signals interact, i.e., are concurrent, may not be consistent and, therefore, may not produce repeatable test results.

Figure 6:
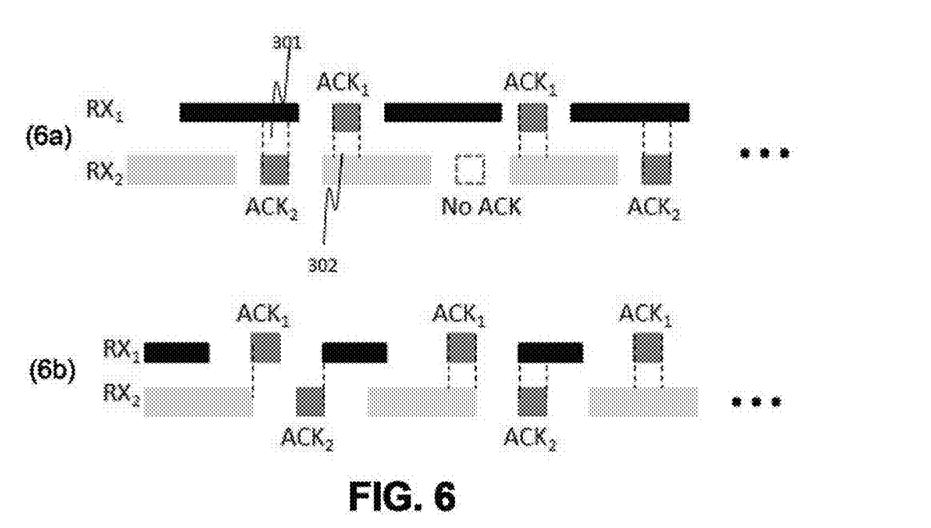
FIG. 6 depicts test intervals which two DUT receivers are operating concurrently and producing interfering transmitted acknowledgement signals.

Referring to FIG. 6, further improvements in test consistency and repeatability can be achieved by using responsive acknowledgement signals ACK of the DUT to produce interfering transmitted signals ACK1, ACK2. In accordance with applicable IEEE standards, relative timing of these ACK signals is well defined and repeatable, thereby allowing for test timing control by the tester, which uses its data packet signal source (e.g., VSG) to send test data packets to each DUT receiver to elicit corresponding responsive acknowledgement signals ACK. By timing the occurrence and duration of these test data packets, the tester can cause the acknowledgement responses ACK to be transmitted in such a manner as to move in time relative to the timing of the DUT receive operation RX1 with which such acknowledgment signals ACK are desired to interfere for testing purposes. This will ensure that receive-transmit RX/TX interference occurs, in aggregate, throughout the entire duration of a receive operation. This can be monitored by the tester by monitoring which test data packets produce acknowledgement packets ACK, and which do not.

As shown in signal sequence 6a, for example, a test data packet from the tester has been received during the second DUT receiver operation RX2 before another test data packet signal from the tester is received during the first DUT receiver operation RX1. Hence, the second DUT receiver operation RX2 will have its corresponding transmitter respond with its acknowledgement ACK2, which is concurrent 301 with a latter portion of the first DUT receiver operation RX1. This results in concurrence of the acknowledgement ACK2, which is a transmitted DUT signal, and operation of the first DUT receiver RX1. Subsequently, in response to the test data packet from the tester received during the first DUT receiver operation RX1, its corresponding transmitter responds with an acknowledgement ACK1 that is concurrent 302 with an early portion of the second DUT receiver operation RX2.

Following reception of a predetermined number of test data packets from the tester by the DUT receivers, the tester can change the start times of its test data packet transmissions such that concurrence of such test data packets and the resulting acknowledgements ACK1, ACK2 will occur at different time intervals. This can be repeated until, in aggregate, there has been concurrence of an acknowledgment signal ACK with the operations of the DUT receivers RX1, RX2 throughout the respective durations of these DUT receiver RX1, RX2 operations. Once such a worst case scenario has been established, it can be replicated for future testing since all signal timing can be controlled by or from the tester.

Also as shown in signal sequence 6a, it can be seen that following operation of the second DUT receiver RX2 to receive the second test data packet, no acknowledgment signal ACK results. This indication of an error, i.e, failure to produce an acknowledgement ACK, could become part of a packet error rate (PER) calculation indicative that during that portion of the test data packet signal during which the first DUT transmitter generates an acknowledgement ACK1, the PER for the second DUT receiver may exceed the prescribed limit. By controlling the timing accurately, one can ensure the worst case test scenario is created and repeated to easily test changes in PER.

As shown in signal sequence 6b, similar data packet durations can be used. As shown, the duty cycles of the test data packet signals from the tester for reception during the first RX1 and second RX2 DUT receiver operations can be chosen such that the corresponding responses ACK1, ACK2 will move in time such that, in aggregate, such acknowledgements ACK1, ACK2 will be concurrent throughout the full durations of the operations of the first RX1 and second RX2 DUT receivers. Hence, instead of varying test data packet start times as shown in signal sequence 6a, different test data packet durations can be used to achieve a comprehensive concurrency of the receive operations and transmitted acknowledgment responses ACK. (Unlike a worst case test scenario as discussed above, this produces a "randomized" PER test result.)

Figure 7:
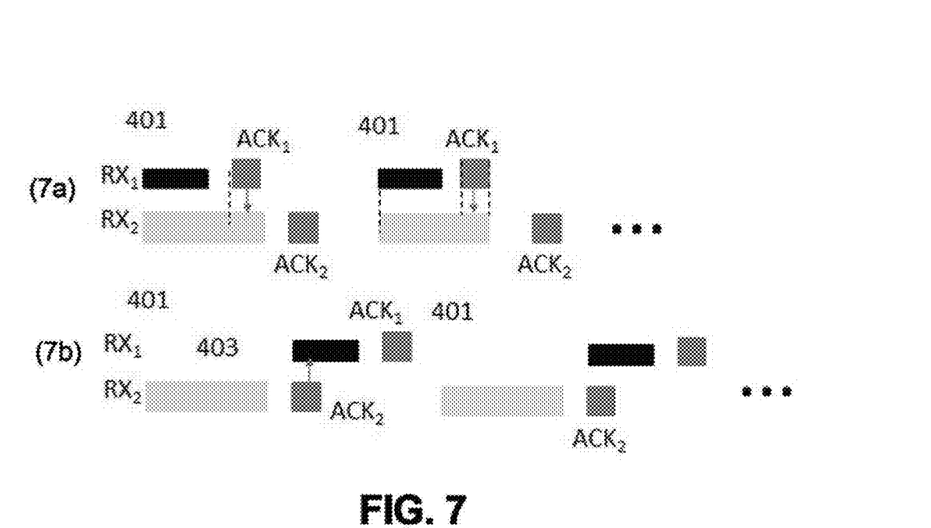
FIG. 7 depicts another test interval in which two DUT receivers are operating concurrently and producing interfering transmitted acknowledgement signals.

Referring to FIG. 7, as an alternative to the signal sequences of FIG. 6, a repeated triggering event 401 can be used to cause both test data packet sources (e.g., VSGs) to execute a single PER test operation using either differences in data packet length or relative delays.

As shown in signal sequence 7a, different data packet lengths can be used to produce repeated interactions, i.e., concurrencies, between the acknowledgements ACK of the shorter data packet with the other DUT receiver operation. This enables a repeatable operation from each triggering event.

As shown in signal sequence 7b, by instead introducing a delay 403 in one of the test data packet sequences, the timing, or position in time, of the interaction (concurrency) can be controlled. Also as shown, this can also be combined with controlling durations of the test data packets to reduce overall test time.

Figure 8:
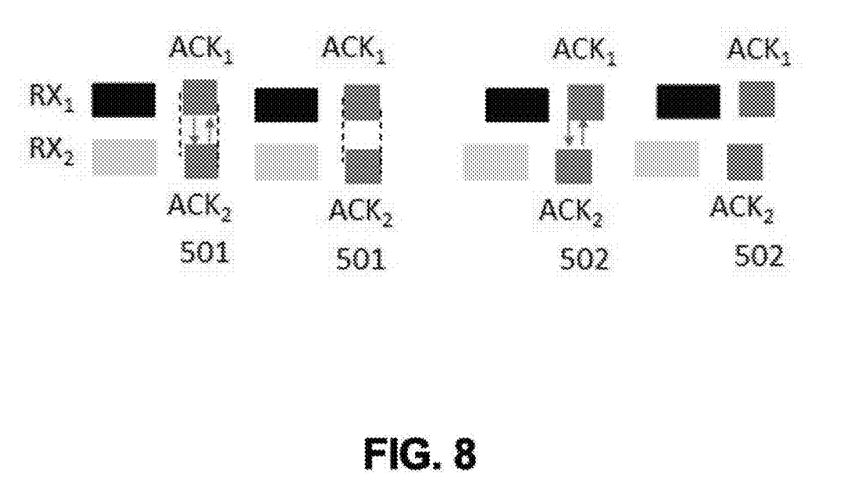
FIG. 8 depicts a test interval in which two DUT receivers are operating concurrently and producing concurrent transmitted acknowledgement signals.

Referring to FIG. 8, the techniques discussed above for the signal sequences of FIGS. 6 and 7 can be extended to generate a controlled interaction between DUT transmitter operations. For example, rather than relying on traditional transmit data packets as discussed above (FIG. 1), interactions (concurrencies) between the acknowledgement signals ACK1, ACK2 transmitted by the DUT can provide the desired transmit-transmit interactions. By aligning the acknowledgement packets ACK received by the receiver of the tester (e.g., VSA), and using higher signal powers, it is possible to cause the acknowledgements ACK1, ACK2 to be fully concurrent 501. Alternatively, by moving tester data packets in time relative to one another, or by controlling data packet length, the acknowledgments ACK1, ACK2 can be caused to overlap 502, thereby enabling the tester to more fully evaluate any effects of their interactions.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a radio frequency (RF) data packet signal transceiver device under test (DUT) with at least first and second RF signal transmitters and first and second RF signal receivers capable of concurrent operations, comprising:

transmitting a first RF test data packet signal including a succession of a first plurality of test data packets;
    receiving, from said first RF signal transmitter, a first RF DUT data packet signal responsive to one or more portions of said first RF test data packet signal in which said first RF DUT data packet signal includes a succession of a first plurality of DUT data packets, wherein each of said succession of said first plurality of DUT data packets is associated with each of said succession of said first plurality of test data packets;
    transmitting a second RF test data packet signal including a succession of a second plurality of test data packets; and
    receiving, from said second RF signal transmitter, a second RF DUT data packet signal responsive to one or more portions of said second RF test data packet signal in which said second RF DUT data packet signal includes a succession of a second plurality of DUT data packets, wherein each of said succession of said second plurality of DUT data packets is associated with each of said succession of said second plurality of test data packets;
    wherein
        each of said succession of said first plurality of DUT data packets is received at least partially concurrently with transmission of a respective one of said succession of said second plurality of test data packets, and
        each of said succession of said second plurality of DUT data packets is received at least partially concurrently with transmission of a respective one of said succession of said first plurality of test data packets.

2. The method of claim 1, wherein each of said succession of said first plurality of test data packets has a duration equal to each of said succession of said second plurality of test data packets.

3. The method of claim 1, wherein each of said succession of said first plurality of test data packets has a duration less than each of said succession of said second plurality of test data packets.

4. The method of claim 1, wherein each of said succession of said first plurality of test data packets is transmitted at least partially concurrently with transmission of a respective one of said succession of said second plurality of test data packets.

5. The method of claim 1, wherein respective ones of said succession of said first and second pluralities of DUT data packets are received during mutually exclusive time intervals.

6. A method for testing a radio frequency (RF) data packet signal transceiver device under test (DUT) with at least first and second RF signal transmitters and first and second RF signal receivers capable of concurrent operations, comprising:

transmitting a first RF test data packet signal including a succession of a first plurality of test data packets;
    receiving, from said first RF signal transmitter, a first RF DUT data packet signal responsive to one or more portions of said first RF test data packet signal in which said first RF DUT data packet signal includes a succession of a first plurality of DUT data packets, wherein each of said succession of said first plurality of DUT data packets is associated with each of said succession of said first plurality of test data packets;
    transmitting a second RF test data packet signal including a succession of a second plurality of test data packets; and
    receiving, from said second RF signal transmitter, a second RF DUT data packet signal responsive to one or more portions of said second RF test data packet signal in which said second RF DUT data packet signal includes a succession of a second plurality of DUT data packets, wherein each of said succession of said second plurality of DUT data packets is associated with each of said succession of said second plurality of test data packets;
    wherein
        each of said succession of said first plurality of DUT data packets is received at least partially concurrently with transmission of a respective one of said succession of said second plurality of test data packets, and
        said succession of said first and second pluralities of DUT data packets are received during mutually exclusive time intervals.

7. The method of claim 6, wherein each of said succession of said first plurality of test data packets has a first duration, each of said succession of said second plurality of test data packets has a second duration, and said first and second durations are unequal.

8. The method of claim 6, wherein each of said succession of said first plurality of test data packets is transmitted at least partially concurrently with transmission of a respective one of said succession of said second plurality of test data packets.

9. The method of claim 6, wherein said succession of said first and second pluralities of test data packets are transmitted during mutually exclusive time intervals.

* * * * *